Sept. 16, 1969　　　　M. A. FELDSTEIN　　　　3,466,694
WINDSHIELD WIPER DEVICE

Filed June 23, 1967　　　　　　　　　　　　3 Sheets-Sheet 1

INVENTOR.
MARVIN A. FELDSTEIN
BY
Teare, Teare & Simmon
ATTORNEYS

Sept. 16, 1969  M. A. FELDSTEIN  3,466,694
WINDSHIELD WIPER DEVICE

Filed June 23, 1967  3 Sheets-Sheet 2

INVENTOR.
MARVIN A. FELDSTEIN
BY
Teare, Teare & Sammon
ATTORNEYS

Sept. 16, 1969  M. A. FELDSTEIN  3,466,694
WINDSHIELD WIPER DEVICE
Filed June 23, 1967  3 Sheets-Sheet 3
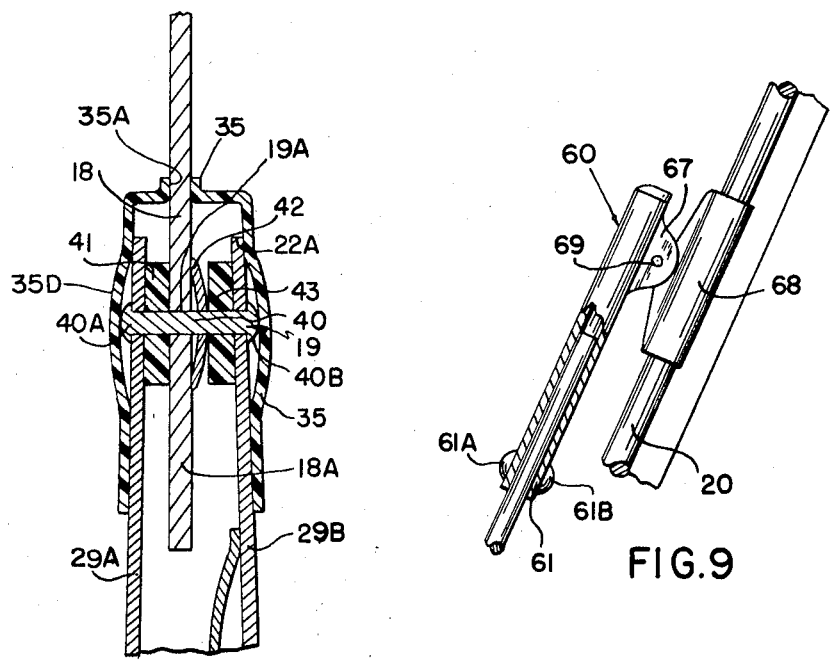
FIG. 6
FIG. 9
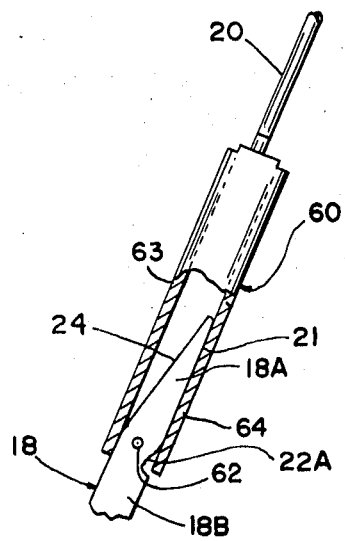
FIG. 10
INVENTOR.
MARVIN A. FELDSTEIN
BY
Teare, Teare & Sammon
ATTORNEYS United States Patent Office 3,466,694
Patented Sept. 16, 1969

3,466,694
WINDSHIELD WIPER DEVICE
Marvin A. Feldstein, 8224 Mentor Ave.,
Mentor, Ohio 44060
Filed June 23, 1967, Ser. No. 648,255
Int. Cl. B60s 1/32
U.S. Cl. 15—250.35   12 Claims

ABSTRACT OF THE DISCLOSURE

A windshield wiper device for use with a motor vehicle comprising a housing pivotally mounted on the vehicle adjacent the windshield thereof and an intermediate arm disposed for pivotal movement with respect to the housing for asymmetric oscillation of the arm with respect to the longitudinal central axis of the housing. A wiper blade and associated blade holder are mounted adjacent the end of the intermediate arm so that the wiper blade traces one selective wiping pattern upon oscillation in one direction and another selective wiping pattern upon oscillation in the opposite direction.

Background of the invention

The present invention relates to vehicle automatic windshield wipers. One problem with conventional windshield wipers is that the blade traces the same path on its forward oscillation as it does on its reverse. As a result, when a portion of the blade wears in advance of the remainder of the blade, streaking occurs. Such uneven wear may be caused by particles of dirt or by a scratch or other imperfection on the windshield. The resultant streaking provides a discomfort to the driver—and even a safety hazard.

Several attempts have been made to solve this problem. The prior art devices required a multiplicity of parts; this not only increased the cost, but also increased the chances of malfunction. In some cases the vision of the driver was obscured to some degree by the attachments. In addition, a problem as to ensured operation at high speeds was present. Still another problem was the ease of removal for replacement and repair. An additional disadvantage was that some of the devices were so inherently bulky and complex that they could not be assembled into a compact, simple, efficient unit. Still another difficulty was in achieving a more positive pushing action where the windshield begins to curve in a more pronounced fashion adjacent the side pillar of the windshield. A further difficulty was in achieving a successful means of increasing the wiped area on the side of the windshield adjacent the pillar.

Summary of the invention

A windshield wiper device having means adapted to be pivotally mounted by first pivot means to a oscillating rotary driving means mounted adjacent the windshield, whereby the base means is oscillatingly driven to describe a generally arcuate path. A second pivot means is mounted adjacent the upper end of the base means. An intermediate arm means is freely pivotally mounted about the second pivot means for pendulum-like movement. Stop means coact between the intermediate arm means and the base means to asymmetrically limit the pendulum-like stroke of the intermediate arms means. A blade holder means, mounted on the intermediate arm means, carries the windshield wiper blade.

By the foregoing arrangement, a windshield wiper device is provided wherein the path of the wiper blade is automatically shifted on the return trace, thereby greatly reducing the streaking of the windshield when uneven wear of the blade commences. The assembly has a minimum number of working parts with a saving in costs and reduction of the chances of malfunction. Further, the device is easy to remove for repair or installation; does not obscure vision; is of a rugged and compact construction which can withstand the wear and tear of constant use and the pressures of high speed driving; and provides a more positive pushing action in conformance with the windshield contour where the windshield commences to curve in a more pronounced fashion adjacent the windshield side pillar, thereby increasing the cleaning ability. Moreover, a successful means is provided for increasing the wiper area on the side of the windshield adjacent the pillar, thereby increasing peripheral vision at a critical location on the windshield so as to reveal lateral dangers and obstructions which would otherwise be hidden from view. Still another advantage is that the device enables the blade to conform more readily to the modern curved windshield and disposes the bottom of the blade so as to coact with greater flatness against the windshield, thereby enhancing the cleaning action. Another advantage is that the shift takes place with minimum movement of auxiliary parts and at the periphery of each swing so as to avoid annoyance or distraction of the driver.

Brief description of the drawings

FIG. 6 is an enlarged fragmentary section view of a preferred form for mounting the pivot assembly of FIG. 4 and taken along line 6—6 of FIG. 4;

FIG. 9 is a fragmentary, partly broken away and partly in section, side elevation view of another embodiment of the present invention; and FIG. 10 is a fragmentary, partly broken away and partly in section, top view of the embodiment shown in FIG. 9.

Description of the preferred embodiments

Figure 1:
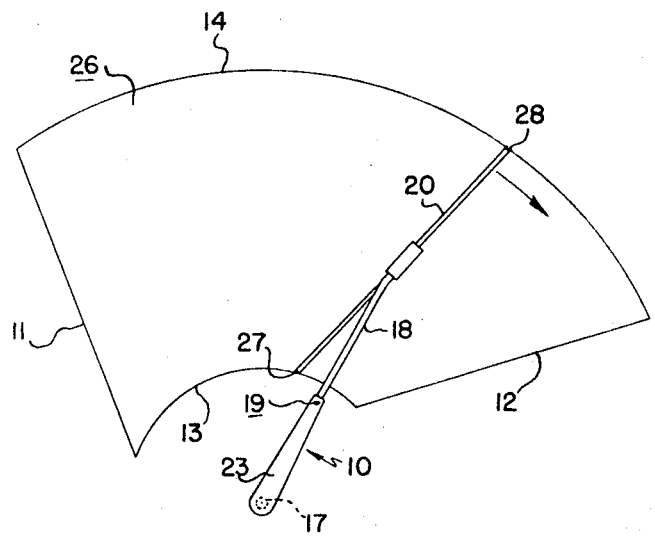
FIG. 1 is a schematic view illustrating the path described by my novel windshield wiper device as it moves in a clockwise direction.
Figure 2:
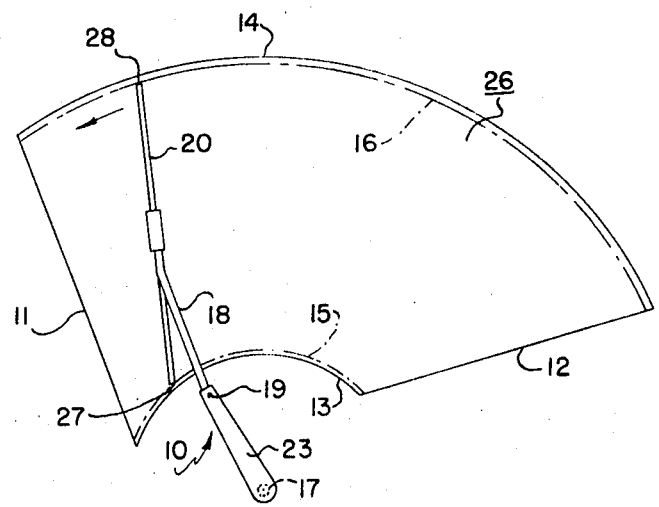
FIG. 2 is a schematic view illustrating in broken lines the path described by my novel windshield wiper device as it moves in a counterclockwise direction.

In general and referring to FIGS. 1 and 2 of the drawings, the windshield wiper device, designated generally at 10, is schematically illustrated mounted on a vehicle (not shown) so as to oscillate over the windshield in a predetermined path designated by arc lines 13 to 14 and margin lines 11 and 12. In FIGS. 1 and 2, the device 10 is shown for oscillation on the windshield, as looking from the outside thereof, so that when pivoted in a clockwise direction it moves towards the vertical center of the vehicle windshield.

Figure 3:
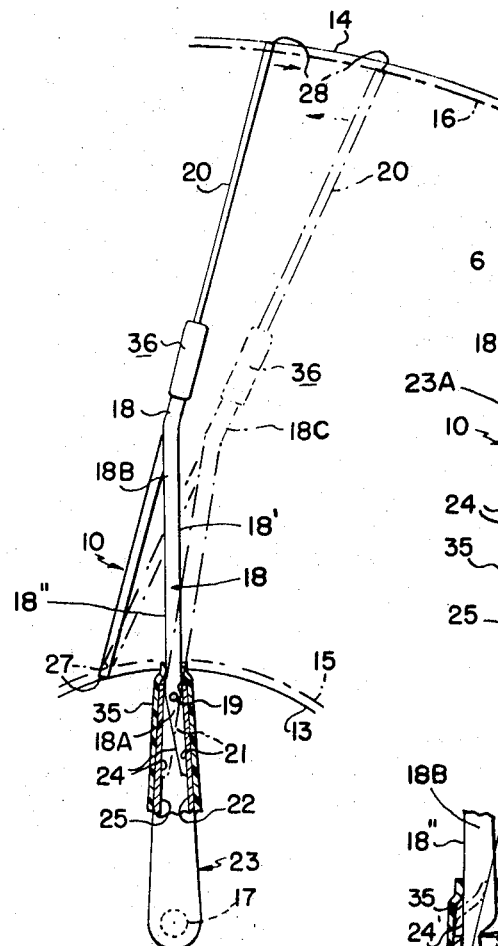
FIG. 3 is a schematic view, partly in section, and partly broken away, illustrating the two positions (solid and broken lines) of the intermediate arm according to the direction of its movement.
Figure 4:
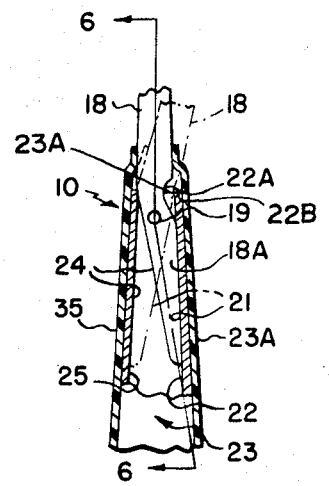
FIG. 4 is an enlarged fragmentary section view of the pivot assembly illustrated of FIG. 3.

As shown in FIG. 3, the device 10 includes a base means in the form of a housing 23 which may be mounted on the vehicle cowl (not shown) for oscillating movement about a first pivot point 17. Any suitable drive mechanism, well known in the art, may be employed to impart oscillation to the housing 23, about the pivot point 17 to achieve a wiping action across the frontal portion of the windshield to be cleaned. The housing 23 is of a hollow construction and pivotally mounts thereon one end of an intermediate arm 18 via opening 23A (FIG. 4) for free oscillation of the arm about a second pivot point 19 disposed adjacent the upper end of the housing and in axial alignment with the first mentioned pivot point 17. The intermediate arm 18 carries adjacent its free end a wiper blade 20 of conventional construction attached to the arm by a blade holder 36, as known in the art. As shown, the arm 18 includes a lower stub portion 18A disposed within the housing 23, an extension portion 18B projecting outwardly from the housing 23, and an upper bent portion 18C which carries the blade holder 36. The lower stub portion 18A is of a triangular construction, including a straight edge 21 forming a linear extension of the arm portion 18B and a tapered edge 24 inclined downwardly in a direction toward the opposite edges 21. As best seen in FIG. 4, the straight edge 21 includes a recessed notched portion 22B disposed adjacent the pivot point 19 for selective overlying engagement with the confronting upper edge 22B of the housing 23. The edges 21 and 24 in conjunction with the notched portion 22A selectively coact with the confronting interior surfaces of the housing 23 upon pivotal movement of the latter about the pivot point 17 for causing oscillatory movement of the wiper blade 18 to a greater extent on one side of the longitudinal central axis of the housing 23 than to the other side to impart an asymmetrical wiping action to the blade. By the foregoing arrangement, the angle of the intermediate arm 18 relative to the housing 23 shifts at the end of each stroke due to the drag of the wiper blade 20 across the windshield, thereby causing the wiper blade 20 to describe one path (defined by the solid lines 13 and 14) while travelling in one direction and a different path (defined by broken lines 15 and 16) when travelling in the opposite direction. For example, when the wiper arm moves in a clockwise direction (FIG. 1), the wiper blade 20 cleans the windshield 26 area defined by the straight lines 11 and 12, and the arcs 13 and 14. When the windshield wiper moves in the counterclockwise direction, as shown in FIG. 2, the wiper blade 20 shifts, and the blade wipes the area of windshield 26 defined by the straight lines 11 and 12 and the arcs 15 and 16. It can be seen from the foregoing, that due to the shift of the blade 20, any given point on the windshield 26 will be wiped by a different confronting portion of the blade 20 when the blade moves in a counterclockwise direction than is wiped by the blade when it moves in the clockwise direction. As a result, the streaking caused by worn surfaces is greatly reduced, and in some cases eliminated. In addition, there is an increase in cleaning area in the corner opposite the notch 22A, for example, the area adjacent the line 11 in FIGS. 1 and 2. In addition the shift occurs adjacent the ends of each swing so as not to annoy or distract a driver or passenger. Moreover, the preferred embodiment has unusual strength characteristics and requires a minimum bulk and its moveable parts are encased and in a position to minimize distraction of the driver.

As best seen in FIGS. 4 and 6, the housing 23 is of a hollow, generally inverted U-shaped construction in section comprising a pair of oppositely disposed side walls 22 and 25 connected together by front 29A and rear 29B wall. The housing 23 includes the opening 23A at its upper end for receiving therethrough the stub portion 18A of the arm 18. The walls 22, 25, 29A and 29B are preferably planar and are inclined inwardly and upwardly toward one another in a direction toward the opening 23A. Preferably, the upper marginal edges of the walls extend slightly above the pivot point 19. The housing 23 may be made of any suitable material, such as metal or the like, as desired.

A preferred form for the mounting assembly for the second pivot point 19 is illustrated in FIG. 6. A pivot pin 40, such as a rivet or the like, may extend transversely of the housing 23 between the front and rear walls 29A and 29B, and rivetably secured thereto, as at 40A and 40B. The pin 40 may pass through an aperture 19A in the intermediate arm 18 thereby pivotally supporting the arm 18 with the housing 23. Washers 41 and 43, preferably of plastic or the like, may be disposed on opposite sides of the intermediate arm 18 to maintain the arm in spaced apart relation from the front and rear walls 29A and 29B of the housing 23. A spring element 42, such as the conical-shaped split washer, preferably of metal or the like, may be disposed between the intermediate arm 18 and the washer 43. The spring element 42 serves to bias the other members of the assembly outwardly against the front and rear walls 29A and 29B, thereby reducing the play in the intermediate arm 18 which may result from extensive wear of the parts.

In order to protect the second pivot means from dirt and the like, a flexible casing 35, preferably of plastic or the like, may be slipped over the upper end of the housing 23 and held in gripping relation thereto, as by friction. The casing 35 may be provided with an opening 35A defined by resilient surrounding flange 35B to receive the intermediate arm 18 therethrough. The size of the opening is preferably less than the cross-sectional area of the intermediate arm 18 so as to provide a snug fit between the arm 18 and the casing 35. The resilient flange 35B is sufficiently yieldable so as to provide a tight gripping engagement with the arm 18, yet to enable the arm to freely oscillate about the pivot point 19 of pin 40. As seen in FIG. 6, casing 35 is of the same general shape as the housing 23 and may be bulged out or provided with arcuate side portions 35D to accommodate the rivet-like heads 40A and 40B. The combined enclosing features of the casing 35 and the walls of the housing 23 serve to provide a protected enclosure for the pivot point 19, thereby preventing the entrance of foreign material, such as twigs, ice or the like, from entering the housing 23 and interfering with the pivotal movement of the intermediate arm 18.

In accordance with the present invention, means are provided to control the angular movement of the intermediate arm 18 to a greater extent on one side of the longitudinal central axis of the housing 23 than on the other side thereof. A form of structure for achieving the aforesaid angular movement is illustrated in FIGS. 3 and 4. The stub portion 18A of the arm 18 is pivotally mounted on the longitudinal axis of the housing 23 and has an asymmetric taper. As shown in FIG. 3, the side walls 22 and 25 of the housing 23 are disposed in spaced apart relation from one another and are adapted for abutting engagement with the edge portions 21 and 24 of the stub portion 18A of the arm 18. The transverse distance between the walls 22 and 25 is preferably greater than the greatest transverse width of the stub portion 18A. Preferably, the side walls 22 and 25 are generally planar as are the edge portions 21 and 24. The angular disposition of the edges of the stub portion 18A and of the side walls 22 and 25 may be arranged so as to have the general plane of the edge portions 21 and 24 coincidental with the general plane of the side walls 22 and 25, respectively, when in abutting engagement thereby distributing the pressure exerted by the stub arm 18A over a greater portion of the confronting surface of the side walls 22 and 25. It is preferred that the asymmetric taper be achieved by having the edge 21 linearly aligned with and an extension of the corresponding edge 18' (FIG. 3) of the projecting portion 18B of the intermediate arm 18, and having the other edge 24 of the stub arm 18A as a continuation of edge 18'' of the projecting portion 18B of the intermediate arm 18 but angularly disposed with respect thereto. Tapering the stub arm 18A in this manner results in the central longitudinal axis of the stub arm 18A being angularly disposed with relation to the longitudinal central axis of the intermediate arm 18. By this arrangement, and referring to FIG. 3, the intermediate arm is caused to rotate a greater distance in a clockwise direction for the edge 24 to contact the side wall 25, than the intermediate arm 18 will have to rotate in a counterclockwise direction for the edge 21 to contact the side wall 22. The recessed notch 22A adjacent the pivot point 19 enables the intermediate arm 18 to pivot laterally over the upper marginal edge 22B of the side wall 22 when the arm 18 is rotated in the clockwise direction to provide sufficient clearance for the arm during such pivotal movement within the housing 23. It is preferred that the notches 22A be disposed on the side of the intermediate arm 18 which is adapted to be mounted on the side of the arm which, in the depressed (horizontal) rest position will align with the line 12 of FIG. 2 (i.e., generally parallel to the bottom edge of the windshield). Such alignment increases the peripheral wiping on the far side lower portions of the windshield. Preferably, the recessed notch 22A is of the configuration shown in FIG. 4 curving sharply inwardly and downwardly commencing slightly above the upper edge 23A of the housing 23 and extending in a gradual reverse curve downwardly and outwardly to a point generally opposite the pivot point 19.

As shown, the upper bent portion 18C of the intermediate arm 18 is disposed at an acute angle with respect to the projecting portion 18B. The wiper blade 20 is disposed in parallel alignment with the upper portion 18C via blade holder 36 so that the blade is disposed at an acute angle with respect to the projecting portion 18B of the arm 18. The blade 20 may be provided with a conventional wiper element, such as of rubber or the like, to impart a clearing action to the surface of the windshield, as known in the art. The range of path shift, that is, the distance between arcs 14 and 16, and the distance between arcs 13 and 15 (FIG. 2) may be varied in accordance with the selection of the angular disposition of the wiper blade 20 relative to the longitudinal central axis of the intermediate arm 18. Generally, the path shift is greater as said angular disposition increases. This angular disposition may be established by preselecting the angle of the bent upper portion 18C to the projecting portion 18B or by preselecting the angular disposition of the wiper blade 20 to the upper portion 18C. The path shift may also be varied by varying the angle of the tapered edge 24 of the stub portion 18A and the depth of the notch 22A.

To obtain maximum wiping efficiency, an appreciable blade shift or lengthwise adjustment of the blade must take place without substantially reducing the transverse width of the wiper blade path. Preferably the range for such a blade shift is between about ¼ to ⁵⁄₁₆ inch between the upper arc 14 and the lower arc 16, as seen in FIG. 2.

Figure 5:
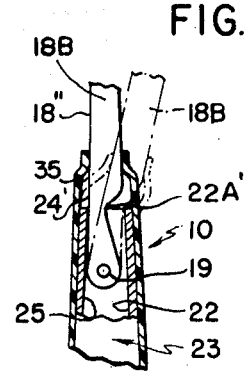
FIG. 5 is a fragmentary, partly broken away and partly in section, front elevation view of a modified form of pivot assembly.

In FIG. 5 there is shown a modification of the invention which is generally similar in operation to that of FIGS. 3 and 4, but wherein the stub arm 18A' is of a different construction and connected adjacent its free end to the pivot point 19, such as in the manner shown in FIG. 6. In this form, however, in place of the tapered edge a similar type recessed notch 22A' is provided to define the edge of the stub arm on one side of the pivot point 19 while the opposed edge 24' is of a straight construction forming a linear extension of the edge 18" of the projecting portion 18B of the intermediate arm 18. In this embodiment, the force of contact is not distributed as it is with the stub portion 18A of the embodiment of FIGS. 3 and 4. By this arrangement, the intermediate arm 18 must rotate farther in the clockwise direction before it contacts the side wall 22 than it must move in the counterclockwise direction before the opposite edge of the wiper arm contacts the opposite sidewall 25.

Figure 7:
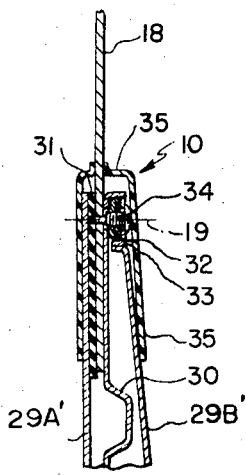
FIG. 7 is a fragmentary side elevation section view of another form for mounting the pivot assembly.
Figure 8:
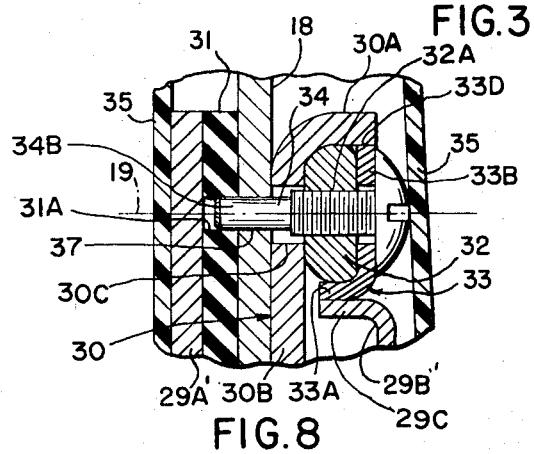
FIG. 8 is an enlarged fragmentary section view of the mounting for the pivot assembly of FIG. 7.

A modification 10' of the assembly for mounting the pivot point 19 is shown in FIGS. 7 and 8. As shown, the assembly 10' is supported by a housing 34 which is similar to the housing 23 previously discussed, except for the rear wall. In this form, the rear wall 29B' has an inwardly projecting flange portion 29C (FIG. 8) which extends generally perpendicular to the front wall 29A'. The assembly 10' includes a reverse L-shaped washer 33 having a flange portion 33A which extends generally parallel to the flange 29C and is supported in abutting relation thereto. The flange portion 33A may be permanently affixed to the flange 29C, as by welding or the like. The washer 33 has a body portion 33B which extends generally perpendicular to and upwardly from the flange portion 33A. A spring member 30, which projects generally vertically upwardly in the housing, has a perpendicular extending flange 30A which extends outwardly generally perpendicular to the upwardly projecting body portion 33B of the washer 33. The flange 30A overlaps the upper marginal edge 33D of the washer 33 and is supported thereby in abutting relation. The body portion 33B, the flange 33A, the flange 30A, and the vertical extending portion 30B of the spring member 30 form a pocket into which may be removably inserted a nut member 32. The spring member 30 may be biased at its lower end in a conventional manner well known in the art so as to urge the nut member 32 against the washer 33, thereby compressibly holding the nut 32. The nut 32 has a radial threaded bore 32A which may be axially aligned with the aperture 33E in the washer 33 and the aperture 30C in the portion 30B of the spring member 30 so as to receive therethrough a partially threaded screw member 34. The threads of the screw 34 are adapted to engage the nut 32 in threaded relation, but pass freely through the apertures 30C and 33E. The head 34A of the screw 34 is adapted to abut the washer 33, whereby upon tightening the screw the threads of the nut will coact with the threads of the screw 34 to pull the head tightly against the washer 33 thereby holding the screw 34 firmly in position. A bearing plate 31, which may be plastic or the like, may be disposed lengthwise along the inner surface of the front wall 29A', and may be attached thereto in any suitable manner such as by adhesives or the like. The bearing plate 31 has an aperture 31A which is adapted to receive in supporting relation therein the terminal end 34B of the screw 34, which terminates short of the front wall 29A'. A wiper arm 18 projects downwardly into the housing as previously described intermediate the bearing plate 31 and the spring member 30. The wiper arm may have an aperture 37 adapted to receive the screw 34 therethrough and which has a slightly larger diameter than does the adjacent portion of the screw 34, thereby permitting the wiper arm 18 to rotate freely about the screw 34.

In FIGS. 9 and 10 there is shown another modification of the invention, but wherein the position of the stub arm 18A of the intermediate arm 18 is reversed and acts as a supporting base for the device. In this form, the housing 60 is pivotally mounted on the stub arm 18A, as at 62, by means of a rivet 61 in a conventional manner by rivet heads 61A and 61B secured to the walls 63 and 64 of the housing 60. The wiper blade 20 includes a blade holder 68 pivotally attached, as at 69, to a flange 67 made integral with and extending from the housing 60, as seen in FIG. 9. Here again, the stub arm 18A is of a similar construction as in FIGS. 3 and 4 and includes a straight edge 21 and a tapered edge 24 disposed for selective coacting engagement with the confronting side walls 63 and 64 of the housing 60. The portion adjacent the straight edge 21 is provided with the recessed notch 22A, but disposed generally below the pivot point 62 for the purposes, as aforesaid. As shown, the edge 21 of the stub arm 18A is parallel to the longitudinal central axis of the projecting portion 18B of the intermediate arm 18 and thus is in abutting relation with the side wall 64 during clockwise movement of the assembly, thereby holding the housing 60 parallel to such longitudinal central axis, whereas, the edge 24 is disposed in angular relation to such axis, thereby shifting the housing 60 at an angle to such central axis when the assembly moves in a counterclockwise direction. The pivot point 62 is disposed offset from and below the center of the wiper blade 20. By the foregoing arrangement the torque about the pivot will be greater at one edge of the blade than at the other edge, thereby causing the blade to rotate about the pivot point resulting in an asymmetrical change of paths, as previously described in connection with FIGS. 1 and 2. The shifting of the mechanism will occur, as with the preferred embodiment of FIGS. 3 and 4, at the extreme ends of the arcing path of the blade 20, thereby avoiding annoyance or distraction of the driver or passengers.

In a typical operation of the preferred embodiment, the wiper blade 20 is shown in FIG. 1 oscillating about the pivot point 17 in a clockwise direction (shown by the arrow) toward the marginal line 12. The solid line showing of the wiper blade 20 in FIG. 3 corresponds to the position of parts in FIG. 1 as the assembly moves in the clockwise direction. As seen in FIG. 3, the wiper blade 20 is tracing the path defined by arcs 13 and 14. As shown, the portion 18B of the intermediate arm 18 is substantially linearly aligned with the longitudinal central axis of the housing 23 with the straight edge 21 of the stub arm 18A disposed in abutting engagement with the confronting surface of the side wall 22. The arm 18 remains in such position relative to the housing 23 for the maximum clockwise swing of the housing—for example, until the blade 20 is in the position indicated by the marginal line 12 in FIG. 1. As the housing commences to move counterclockwise, the drag on the blade 20 causes the arm 18 to pivot about the second pivot means until the angularly disposed edge 24 of the stub portion 18A engages the wall 25. During this process the blade 20 progressively shifts its angle relative to the central axis of the housing until it is disposed at the angle to trace the arcs 15 and 16 for the remainder of the counterclockwise movement. The recessed notch 22A provides sufficient clearance between the confronting edge of the intermediate arm 18 and the marginal edge 22B of the housing 23 to achieve the aforementioned abutting relation of the tapered edge 24 with the wall 25. This angular disposition is maintained during the complete return counterclockwise stroke of the wiper blade 20 until the wiper blade achieves its maximum counterclockwise swing. The housing 23 will then begin its clockwise movement. The coaction of the drag on the windshield wiper and the arcuate movement of the second pivot point 19 will cause the wiper arm to reassume the position wherein the straight edge 21 of the stub portion 18A is aligned with the side wall 22 causing the blade 20 to retrace the path between arcs 13 and 14.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:

1. A windshield wiper assembly for asymmetrical wiping action on a windshield surface or the like comprising,
    an actuating base member adapted to be connected at one end to a support member for oscillating rotational movement about a fixed pivot axis,
    a pair of laterally spaced abutment portions disposed adjacent an opposed end of said base member,
    an elongated, intermediate arm member connected at one end to a movable pivot axis disposed adjacent the said opposed end of said base member for oscillating rotational movement with said base member and pivotal movement about said movable pivot axis,
    said intermediate arm member having an inner arm portion connected by said movable pivot axis between said abutment portions and an outer arm portion extending lengthwise from said inner arm portion, said inner arm portion including laterally spaced asymmetrical abutment means adapted for alternating engagement with said abutment portions to hold said intermediate arm member in substantial alignment with respect to said base member upon pivotal movement of said base member in one direction and to hold said intermediate arm member in a predetermined angularly oriented relation with respect to said base member upon pivotal movement of said base member in the opposite direction, and
    a wiper blade member mounted adjacent an outer end of said outer arm portion adapted to be moved through a forward arc when said base and intermediate arm members are pivoted in said first mentioned direction and then pivoted into said angularly oriented position without substantial radial movement thereof toward said base member to move through a different return arc upon pivotal movement of said base member in said opposite direction.

2. A windshield wiper assembly in accordance with claim 1, wherein
    said forward arc is defined by a first pair of imaginary, laterally spaced arcuate inner and outer lines, and
    said return arc is defined by another pair of imaginary, laterally spaced inner and outer arcuate lines in radially spaced relation within the marginal confines of said first pair of arcuate lines.

3. A windshield wiper assembly in accordance with claim 2, wherein
    said blade member is of an elongated construction having an inner end portion for tracing the inner arcuate lines of said forward and return arcs and an outer end portion for tracing the outer arcuate lines of said forward and return arms, and
    the inner and outer end portions of said blade member being disposed in radially inward spaced relation from said inner and outer arcuate lines upon movement of said blade member to define the inner and outer arcuate lines of said return arc.

4. A windshield wiper assembly in accordance with claim 2, wherein
    said blade member is of an elongated construction having inner and outer end portions,
    said blade member being mounted in angularly off-set relation on said outer arm portion between its inner and outer end portions, and the outer end portion of said blade member being pivoted downwardly and inwardly in a direction of movement of said intermediate arm member and with the inner end portion thereof being pivoted upwardly and outwardly away from the direction of movement of said intermediate arm member upon movement of said blade member in said return arc.

5. A windshield wiper assembly in accordance with claim 2, wherein
    the abutment means on said inner arm portions includes a first edge surface extending in general alignment with a corresponding edge on said outer arm portion, and a second edge surface extending convergently from said outer arm portion toward said first edge surface, and said first edge surface being disposed in the direction of return movement of said blade member in said return arc.

6. A windshield wiper assembly in accordance with claim 5, wherein
    said first edge surface constitutes an extension of and is co-planar with the said corresponding edge of said outer arm portion,
    the general planes of said first and second edge surfaces being substantially coincident with the general planes of said abutment portions in the engaged position of the respective edge surfaces with said abutment portions.

7. A windshield wiper assembly in accordance with claim 5, wherein
    said first edge surface includes a recessed portion adapted for overlying engagement with a respective one of said abutment portions to provide clearance for said inner arm portion upon movement of said blade member in said return arc.

8. A windshield wiper assembly in accordance with claim 2, wherein
   said base member includes a hollow housing having laterally spaced inclined side walls defining said abutment portions, and
   the general planes of said first and second edge surfaces being substantially coincident with the general planes of said side walls in the engaged position of said edge surfaces with said side walls.

9. A windshield wiper assembly in accordance with claim 8, including
   a flexible casing having a reduced opening at one end disposed around said housing, and
   said inner arm portion extending outwardly through said opening for tight sealing engagement with said casing upon relative pivotal movement between said intermediate arm and base members.

10. A windshield wiper assembly in accordance with claim 2, wherein
    said base member includes a housing having laterally spaced inclined side walls defining said abutment portions,
    said movable pivot axis including a pin member extending transversely between said side walls for rotatably mounting the inner arm portion of said intermediate arm member thereon, and
    resilient means coacting between said inner arm portion and a respective one of said side walls for resiliently controlling movement of said intermediate arm member with respect to said housing.

11. A windshield wiper assembly in accordance with claim 2, wherein
    the attachment means on said inner arm portion includes a notched surface on one side thereof adapted for engagement with one of said abutment portions, and a straight surface on an opposite side thereof extending in general alignment with a corresponding edge surface on said outer arm portion adapted for engagement with the other of said abutment portions, and
    said notched surface being disposed in the direction of return movement of said blade member to provide clearance for said intermediate arm member upon movement of said blade member in said return arc.

12. A windshield wiper assembly in accordance with claim 2, wherein
    said blade member is connected in angularly off-set relation on said outer arm portion,
    said movable pivot axis being fixed relative to said fixed pivot axis and being movable with said base member, and
    the connection of said blade member with said outer arm portion being disposed in angularly off-set relation with respect to said movable pivot axis.

References Cited
UNITED STATES PATENTS

| | | | |
|---|---|---|---|
| 2,624,904 | 1/1953 | Wianco | 15—250.23 |
| 2,676,821 | 4/1954 | Reichelderfer | 15—250.35 XR |
| 2,740,152 | 4/1956 | Mosher | 15—250.35 |
| 2,821,735 | 2/1958 | Perkins et al. | 15—250.23 XR |

PETER FELDMAN, Primary Examiner

U.S. Cl. X.R.

15—250.23